United States Patent [19]

Fujita et al.

[11] 3,879,444

[45] Apr. 22, 1975

[54] PROCESS FOR THE OXIDATIVE PURIFICATION OF DIMETHYL PHTHALATES

[75] Inventors: Yasuhiro Fujita, Hiroshima; Takenori Nagaoka, Yamaguchi; Yuji Simokawa, Hiroshima, all of Japan

[73] Assignee: Mitsui Petrochemical Ind., Ltd., Tokyo, Japan

[22] Filed: Apr. 13, 1973

[21] Appl. No.: 350,874

[30] Foreign Application Priority Data
Apr. 13, 1972 Japan.............................. 47-36488

[52] U.S. Cl............................................. 260/475 B
[51] Int. Cl............................................. C07c 69/80
[58] Field of Search ................................. 260/475 B

[56] References Cited
UNITED STATES PATENTS
3,461,153   8/1969   Tholstrup et al................. 260/475 B
3,576,842   4/1971   Kimura et al..................... 260/475 B FOREIGN PATENTS OR APPLICATIONS
1,043,289   9/1966   United Kingdom............. 260/475 B
1,032,730   6/1966   United Kingdom............. 260/475 B

*Primary Examiner*—Lorraine A. Weinberger
*Assistant Examiner*—E. Jane Skelly
*Attorney, Agent, or Firm*—Sughrue, Rothwell, Mion, Zinn & Macpeak

[57] ABSTRACT

A dimethyl phthalate prepared from a phthalic acid which has been obtained by the oxidation of a xylene is treated with a gas containing molecular oxygen in the presence of a compound selected from the group consisting of an alkali metal compound and/or an alkaline earth metal compound under liquid phase conditions, and then the dimethyl phthalate is separated from the resultant oxidized product, whereby the separated dimethyl phthalate is oxidatively purified. The purification can be improved when a heavy metal compound is used together with the alkali and/or alkaline earth metal compound.

18 Claims, No Drawings

3,879,444

PROCESS FOR THE OXIDATIVE PURIFICATION OF DIMETHYL PHTHALATES

BACKGROUND OF THE INVENTION

1. Field of the Invention

The present invention relates to a process for the oxidative purification of dimethyl phthalates prepared from phthalic acids which have been obtained by the oxidization of xylenes.

2. Description of the Prior Art

Dimethyl phthalates are useful as plasticizers for a variety of rubbers and plastics and as raw materials for polyesters. In particular, dimethyl terephthalate and dimethyl isophthalate have been widely utilized as intermediates in preparing polyesters. It is well known that, in such use as mentioned above, the existence of even a slight or trace amount of impurities in the intermediate phthalates cause a decrease in the quality of the resultant polyesters, and therefore, it is necessary that the dimethyl phthalates have high purity and high quality. In particular, when dimethyl terephthalate or dimethyl isophthalate is to be conveyed to a remote place while being in a molten state, it is necessary that these phthalates be stable and not discolor, even after being at high temperature and in the molten state for a long period of time, that is, that they have excellent color stability.

Phthalic acids which have been obtained by oxidizing xylenes with oxygen in the presence of an oxidation catalyst or by means of an oxidizing agent, such as nitric acid, contain various impurities such as oxidized intermediates, oxidized by-products, etc., although the content of the impurities is small. Accordingly, dimethyl phthalates which are prepared by esterifying these phthalic acids with methanol naturally contain various impurities such as oxidized intermediates, oxidized by-products, esters of oxidized intermediates, esters of oxidized by-products, and the like, although the content of these impurities is also small.

It is well known that among these impurities methyl formylbenzoate greatly affects the preparation of polyesters when the dimethyl terephthalate or dimethyl isophthalate is subjected to transesterification with glycols, that is, the pressure of methyl formylbenzoate during preparation retards the polycondensation speed, reduces the polymerization degree and harmfully effects the coloration of the polyesters.

It has hitherto been known to purify dimethyl phthalates by treating them with a gas containing molecular oxygen to remove the impurities contained therein. For example, British Pat. Nos. 1,032,730 and 1,043,289 describe such a method. In British Pat. No. 1,032,730, a process for purifying dimethyl phthalates is proposed wherein the dimethyl phthalates are brought into contact with molecular oxygen in the presence of manganese or copper compounds which are soluble in the reaction system. In British Pat. No. 1,043,289 there is proposed a process for purifying dimethyl phthalates wherein the phthalates are brought into contact with molecular oxygen in the presence of chromium or nickel compounds.

SUMMARY OF THE INVENTION

The inventors have studied the process for the oxidative purification of dimethyl phthalates using molecular oxygen and found the following facts: methyl formylbenzoate may fairly effectively be removed by means of the conventional purifying methods as above, but these conventional methods have other faults, that is, upon the removal of the methyl formylbenzoate to purify the dimethyl phthalates by means of these conventional methods, a slight amount of other new impurities are produced, the structures of which are as yet unknown. These new impurities are themselves colorless, but when dimethyl terephthalate or dimethyl isophthalate has been kept in the molten state at a high temperature for a long period of time, these impurities harmfully effect the color stability. Accordingly, the inventors continued to zealously study the problem of how to avoid the formation of these new impurities formed during the purification of the dimethyl phthalates, in order to develop excellent products which do not discolor even after being maintained in the molten state at high temperature for a long period of time. As a result they found that the purification is surprisingly attained very effectively when the dimethyl phthalates are brought into contact with oxygen or an oxygen containing gas in the presence of an alkali metal compound and/or an alkaline earth metal compound. The inventors have also found that the effect of purification is further improved when a heavy metal compound is used together with the alkali metal and/or alkaline earth metal compound. Of course, the existence of the alkali metal compound and/or the alkaline earth metal compound does not interfere with the oxidation or oxidative decomposition of the methyl formylbenzoate or other impurities derived from the raw materials, phthalic acids.

The object of the present invention is to oxidatively purify dimethyl phthalates prepared from phthalic acids which have been obtained by the oxidization of xylenes.

Another object of the present invention is to provide an improved process for the oxidative purification of dimethyl phthalates characterized in that a dimethyl phthalate prepared from a phthalic acid which has been obtained by the oxidization of a xylene is treated with a gas containing molecular oxygen, in the presence of a compound selected from the group consisting of an alkali metal compound and/or an alkaline earth metal compound and under a liquid phase condition, and then the dimethyl phthalate is separated from the resultant oxidized product.

The oxidative purification of the present invention can be carried out in the presence of a heavy metal compound together with the alkali metal and/or alkaline earth metal compound.

DETAILED DESCRIPTION OF THE INVENTION

The dimethyl phthalates which are used in the present invention are prepared by esterifying phthalic acids with methanol, the phthalic acids being ones obtained by oxidizing xylenes, and more specifically are dimethyl orthophthalate, dimethyl terephthalate and dimethyl isophthalate. In particular, the present invention is remarkably effective in the oxidative purification of dimethyl terephthalate.

The phthalic acids are usually prepared by oxidizing xylenes in the liquid phase with either molecular oxygen or a molecular oxygen-containing gas in a monocarboxylic acid medium having 2 to 8 carbon atoms, the weight ratio of the monocarboxylic acid medium to the xylenes being in the range from 2 to 1 up to 12 to 1, at a temperature of 90° to 280°C and at a pressure of from normal atmosphereic pressure to 50 kg/cm² gauge in the presence of a cobalt-containing catalyst.

Phthalic acid obtained by reacting xylenes with dilute nitric acid at superatmospheric pressure at a temperature of 150° to 250°C can also be used, since a common type of impurity causing the problem which the present invention solves is also encountered with such systems.

These processes are not limitative, of course, and the present invention finds application with any dimethyl phthalate system containing impurities as described in this application, the harmful effect of which can be removed in accordance with the present invention.

The generally used conditions for esterifing phthalic acids with methanol are: temperature, 150° – 300°C; pressure, 5 – 200 kg/cm² gauge; reacting 5 – 30 moles of methanol with 1 mole of phthalic acid in the liquid phase in the presence of a catalyst or in the absence of a catalyst, typical catalysts being sulfuric acid, copper metal, zinc metal, tungsten metal, oxide of copper, zinc, manganese or molybdenum, salts of organic acids with copper, zinc, manganese or molybdenum, silicotungstate, silicomolybdate, etc.

The impurities formed during the oxidation of xylenes remain mixed in the resultant dimethyl phthalates, either as such or in the form of esters after being esterified, or in any other forms after being further changed. In particular, formylbenzoic acid is converted into methyl formylbenzoate, which is the primary cause of a decrease in purity and quality of dimethyl phthalates. The present invention is to oxidize or oxidatively decompose the impurities predominantly consisting of methyl formylbenzoate by means of oxygen or an oxygen containing gas, whereupon the formation of any other impurities with an unknown structure which reduce color stability is avoided, thereby improving the purity and the quality of the dimethyl phthalates after they are rendered molten and conveyed.

The alkali metal compounds or alkaline earth metal compounds used in the present invention are compounds containing at least one metal of lithium, sodium, potassium, mmagnesium, and calcium, and in particular, a lithium compound, a sodium compound and a potassium compound are preferred. The alkali metal compounds or alkaline earth metal compounds are preferably soluble in the reaction system.

As the alkali metal compounds and/or alkaline earth metal compounds, for example, organic acid salts having 1 to 20 carbon atoms carbonates, bicarbonates, phosphates, borates, hydroxides, alcoholates having 1 to 5 carbon atoms or phenolates having 6 to 8 carbon atoms of the above mentioned alkali metals or alkaline earth metals are most preferred. Particularly preferred are for example, salts of aliphatic carboxylic acids having 1 to 18 carbon atoms such as formate, acetate, propionate, butyrate, valerate, caproate, caprate, octylate, decanoate, laurate, palmitate, oleate, stearate, oxalate, succinate, adipate, sebacate, etc.; salts of cycloaliphatic carboxylic acid such as naphthenate, hexahydrobenzoate, etc.; salts of aromatic carboxylic acid such as benzoate, terephthalate, isophthalate, orthophthalate, a salt of the monomethylester of terephthalic acid, a salt of the monomethyl ester of isophthalic acid, a salt of the monomethyl ester of orthophthalic acid,; carbonates; bicarbonates; hydroxides; alcoholates such as the methylate, ethylate and propionate and phenolates such as phenolate and cresolate of the above-mentioned alkali metals or alkaline earth metals. Obviously, more than one alkali metal compound can be used n combination with more than one alkaline earth metal compound.

The amount of these alkali metal and/or alkaline earth metal compound(s) used is in the range of about $10^{-10}$ gram-atoms to about $5 \times 10^{-5}$ gram-atoms, preferably from $10^{-10}$ gram-atoms to $10^{-6}$ gram-atoms, in terms of metal atoms per 1 g of dimethyl phthalate.

If the amount of these compounds exceeds about $5 \times 10^{-5}$ gram-atoms, further improvement on the purification can not be attained, rather, on the contrary, too great an amount of the compounds can cause the blocking or stoppage of the apparatus in the oxidization step or the distillation step.

The heavy metal compound of compounds which can be used in the present invention together with the above mentioned alkali metal and/or alkaline earth metal compounds are compounds of heavy metals as defined in the "Periodic chart of the Elements" or pages 56 and 57 of "Handbook of Chemistry" 8th Edition, 1952, Hondbook Publishers, Sandusky, Ohio, U.S.A., as disclosed in U.S. Pat. No. 2,833,816 Saffer et al. (though for different process). The preferred compounds are of at least one of chromium, manganese, cobalt, nickel, copper, molybdenum palladium, antimony and the lanthanides. Particularly preferred are compounds of chromium, manganese, nickel or copper. The heavy metal compounds are preferably soluble in the reaction system, and for this reason, organic acid salts having 1 to 18 carbon atoms inorganic acid salts such as carbonates, phosphates halides, nitrates, bonates, and organic complexs such as acetyl acetonate, phthaloxyanide, hyroxy quinolinate, ethylene diamine tetraacetate, and of the above mentioned heavy metals are preferred. In particular, aliphatic carboxylates such as formate, acetate, propionate, oxalate, valerate, caproate, caprylate, oleate, etc.; cycloaliphatic carboxylates such as naphthenate, hexahydrobenzoate, etc.; aromatic carboxylates such as benzoate, terephthalate monoalkyl ester, etc.; metal acetyl acetonate, metal phthalocyanine, silicafluoride, and like compounds of the above-mentioned heavy metals are preferred.

The amount of the heavy metal compound(s) used is sufficient if in the range of about $10^{-9}$ gram-atoms to about $10^{-3}$ gram-atoms of metal atoms, per 1 g of the dimethyl phthalates treated. Mixtures of heavy metal compounds can, of course, be used to exhibit the effects of the individual components.

In the process of the present invention, the contact of the dimethyl phthalates with the oxygen or oxygen containing gas is carried out in the liquid phase, that is, in such state that the dimethyl phthalates are molten or are dissolved in a solvent which is inert to the oxidization. As the solvent, hydrocarbons, halogenated hydrocarbons, organic acids, organic acid esters, etc., can be used. Specific examples of the solvent used are hydrocarbons such as hexane, heptane, benzene, toluene, xylene, etc., halogenated hydrocarbons such as chloroform, trichloroethane, chlorobenzene, etc., and organic acid esters such as ethylacetate, butylacetate, methyl benzoate, etc. Organic acids should not be used as the solvent. It is preferred to bring the dimethyl phthalates into contact with a gas containing molecular oxygen while the phthalates are in the molten state, without using the solvent.

In the process of the present invention, pure oxygen, air admixed with oxygen gas or a mixture of oxygen with an inert gas such as $N_2$ or $CO_2$ can be used for the oxidization. The amount of the oxygen containing gas used is sufficient if it is more than the amount stoichiometrically necessary for the oxidization of impurities, and thus the amount is not specifically limited, however, an amount of about $3l$ to about $1 Kl$ of oxygen per 1 kg of dimethyl phthalate calculated as oxygen at a normal temperature and pressure is industrially preferable. In order to prevent the danger of explosion, steam, inert gas, etc., may be introduced in the gaseous part of the reaction system.

Although the temperature of the treatment of dimethyl phthalates with a gas containing molecular oxygen can be varied in a wide range, a temperature of about 140° to about 300°C, particularly 150° to 280°C, is generally preferred. The treatment is normally carried out under atmospheric pressure, but can be carried out under elevated pressure or under reduced pressure. In particular, the pressure of the treatment is in the ranges of atmospheric pressure to a guage pressure of about 30 kg/cm². The time for the oxidization reaction in the present invention is not particularly limited, but on an industrial scale will usually be from about 10 to about 240 minutes, more often 20 to 120 minutes being sufficient.

The process of the present invention can be performed according to any batch or continuous manner. For the contact of dimethyl phthalate with molecular oxygen, any well-known gas-liquid contact method can be used in the present invention. Bubbling the oxygen gas through the dimethyl phthalate, or contacting the dimethyl phthalate with the oxygen gas using a gas-liquid contact apparatus with a sieve tray is especially preferable. While a method where the oxgen is bubbled through the dimethyl phthalate and the mixture is violently stirred can also be used, the purification is not as good as with the methods recited above. If necessary, crude dimethyl phthalates obtained from phthalic acids can previously be distilled for the purpose of removing substances which interfere with the oxidization reaction, such as iron compounds, and afterwards the present method can be applied to the resultant fraction.

The separation of high purity dimethyl phthalates from the oxidized reaction product which is obtained from the contact with a gas containing molecular oxygen in accordance with this invention is carried in a known manner. Distillation of oxidized reaction product is the method most commonly employed for separation of high purity dimethyl phthalates. The distillation of the final product can be conducted under reduced pressure, atmospheric pressure or elevated pressure. Especially, reduced pressure of about 5 mmHg to 600 mmHg is preferable on an industrial scale. However, when the oxidized reaction product is dissolved in a solution or when the oxidized reaction product is dissolved by adding thereto a solvent, the separation of dimethyl phthalates can also be carried out by crystallization after cooling the solution containing oxidized reaction product.

The present invention will now be illustrated in more detail by the following examples of several preferred embodiments of the present invention.

EXAMPLES 1–27

Paraxylene was oxidized in acetic acid solvent in the presence of a cobalt compound, a manganese compound and a bromine compound to obtain terephthalic acid. The oxidation reactor was fed (hourly rate) 300g paraxylene, 1800g of acetic acid and as an oxidation catalyst 3.0g cobalt acetate, 1.6g manganese acetate and 3.6g sodium bromide. The oxidation reaction was carried out at 190°C and at 12 kg/cm² gauge while introducing air in a slight stoichiometric excess into the reactor from the bottom for 60 minutes. The yield of the thus obtained terephthalic acid was 96 mole percent. The terephthalic acid obtained was esterified with methanol in the absence of catalyst, i.e., the following componants were reacted in an autoclave (butch) at the recited conditions;

| | |
|---|---|
| terephthalic acid | 300g. |
| methanol | 350g. |
| catalyst | none. |
| reaction temperature | 260°C. |
| reaction pressure | 100 kg/cm² guage and |
| reaction time | 40 minutes. |

Methanol and water were separated distillation from the resultant product mixture to obtain dimethyl terephthalate. The resultant ester contained 0.4 percent (by weight) of methyl paraformylbenzoate. The molten color of the dimethyl terephthalate obtained at 150°C was 500 APHA.

To 300g of the above dimethyl terephthalate there was added an alkali metal compound or an alkaline earth metal compound as shown in Table 1 hereunder, and oxygen gas was fed thereto at a rate of 20l/hour, whereby the contact of the ester and the oxygen gas was performed for 30 minutes at 235°C and at atmospheric pressure whereafter the resultant reaction mixture was distilled at a pressure of 40 mm Hg and at a temperature of 183°C (at the top of the tower). The content of methyl paraformylbenzoate (4-CBA-Me) in the dimethyl terephthalate (DMT) obtained after the distillation the initial molten color and the color stability of the dimethyl terephthalate are shown in Table 1.

After the dimethyl terephthalate was heated for 5 minutes at 200°C, the initial molten color of the dimethyl terephthalate was measured by comparison with the APHA (American Public Health Association) standard solution (See U.S. Pat. No. 3,288,843 Friedman). The color stability of the dimethyl terephthalate was determined as follow; after the dimethyl terephthalate was kept: for 10 days at 170°C in a cyclindric container made of Stainless Steel its molten color was measured, by comparison with the APHA Standard Solution.

For comparison, the same procedure was repeated without the addition of the alkali metal or alkaline earth metal compound (Comparative Example 1), and the results thereof also are shown in Table 1.

COMPARATIVE EXAMPLE 2

To 300g of the dimethyl terephthalate of Example 1 there was added sodium acetate in an amount of $5 \times 10^{-9}$ gram-atoms/g, and the mixture was heated at 235°C for 30 at atmospheric pressure minutes without feeding oxygen thereto and then distilled as in Example 1. The results of analysis of the resultant dimethyl terphthalate obtained after the distillation are also shown in Table 1, for comparison.

Table 1

| Example | Alkali metal compound or Alkaline earth metal compound | ($\times 10^{-9}$ gram-atoms/g-DMT) | 4-CBA-Me (ppm) | Purified DMT Initial molten Color (APHA) | Color stability |
|---|---|---|---|---|---|
| 1 | sodium acetate | 5 | 35 | 10 | 50 |
| 2 | lithium propionate | 100 | 35 | 10 | 50 |
| 3 | potassium butyrate | 500 | 40 | 10 | 55 |
| 4 | sodium octylate | 1 | 30 | 10 | 60 |
| 5 | calcium laurylate | 10 | 45 | 10 | 70 |
| 6 | magnesium caprate | 1000 | 45 | 10 | 70 |
| 7 | potassium palmitate | 1 | 35 | 10 | 60 |
| 8 | sodium formate | 50 | 30 | 10 | 55 |
| 9 | sodium oxalate | 10000 | 40 | 10 | 50 |
| 10 | calcium succinate | 300 | 45 | 10 | 75 |
| 11 | magnesium adipate | 800 | 40 | 10 | 80 |
| 12 | sodium naphthenate | 50 | 30 | 10 | 55 |
| 13 | potassium hexahydro benzoate | 100 | 35 | 10 | 50 |
| 14 | disodium terephthalate | 10 | 30 | 10 | 60 |
| 15 | potassium monomethyl terephthalate | 500 | 40 | 10 | 55 |
| 16 | sodium benzoate | 100 | 35 | 10 | 60 |
| 17 | lithium benzoate | 100 | 30 | 10 | 60 |
| 18 | sodium carbonate | 10 | 30 | 10 | 50 |
| 19 | potassium bicarbonate | 5 | 35 | 10 | 55 |
| 20 | sodium phosphate | 300 | 30 | 10 | 80 |
| 21 | sodium hydroxide | 10 | 35 | 10 | 50 |
| 22 | lithium hydroxide | 3 | 35 | 10 | 50 |
| 23 | potassium hydroxide | 1 | 35 | 10 | 60 |
| 24 | sodium methylate | 10 | 30 | 10 | 50 |
| 25 | potassium ethylate | 50 | 35 | 10 | 60 |
| 26 | lithium isopropionate | 50 | 40 | 10 | 60 |
| 27 | sodium borate | 100 | 35 | 10 | 80 |
| Comparative Example 1 | none | | 40 | 35 | 150 |
| Comparative Example 2 * | sodium acetate | 5 | 3000 | 60 | 900 |

* without oxygen, only under heat.

EXAMPLES 28 – 41

To 300g of the dimethyl terephthalate of Example 1 was added an alkali metal compound or an alkaline earth metal compound and a heavy metal compound as shown in the Table 2, and oxygen gas was fed thereto at a rate of 20 l/hour, whereby the contact of the ester and the oxygen gas was carried out for 30 minutes at 235°C at atmospheric pressure. Thereafter, the resultant reaction mixture was distilled as in Example 1. The results of an analysis of the resultant dimethyl terephthalate obtained after the distillation are shown in Table 2.

Table 2

| Example | Alkali metal compound or Alakline earth metal compound ($\times 10^{-9}$ gram-atoms/g) | | Heavy metal compound ($\times 10^{-6}$ gram-atoms/g) | | 4-CBA-Me (ppm) | Purified DMT Initial molten color (APHA) | Color stability (APHA) |
|---|---|---|---|---|---|---|---|
| 28 | lithium acetate | 5 | nickel naphthenate | 1 | 10 | 10 | 30 |
| 29 | sodium acetate | 0.5 | chromium benzoate | 10 | 10 | 10 | 30 |
| 30 | sodium bicarbonate | 50 | chromium naphthenate | 20 | 10 | 5 | 15 |
| 31 | potassium benzoate | 100 | chromium hexahydro-benzoate | 10 | 10 | 5 | 25 |
| 32 | potassium monomethyl terephthalate | 10,000 | chromium monomethyl terephthalate | 50 | 5 | 5 | 15 |
| 33 | potassium carbonate | 5 | manganese naphthenate | 1 | 10 | 10 | 25 |
| 34 | potassium bicarbonate | 100 | chromium caproate | 20 | 10 | 10 | 20 |
| 35 | magnesium acetate | 50 | copper naphthenate | 1 | 10 | 10 | 30 |
| 36 | sodium monomethyl isophthalate | 5,000 | chromium acetate | 10 | 5 | 5 | 15 |
| 37 | dipotassium orthophthalate | 500 | palladium acetate | 50 | 10 | 10 | 40 |

Table 2 — Continued

| Example | Alkali metal compound or Alakline earth metal compound ($\times 10^{-9}$ gram-atoms/g) | | Heavy metal compound ($\times 10^{-6}$ gram-atoms/g) | 4-CBA-Me (ppm) | Purified DMT Initial molten color (APHA) | Color stability (APHA) |
|---|---|---|---|---|---|---|
| 38 | disodium sebacate | 100 | chromium acetyl acetonate | 10 | 5 | 15 |
| 39 | calcium stearate | 10 | nickel oxalate | 10 | 10 | 25 |
| 40 | sodium succinate | 5 | antimony acetate | 100 | 10 | 40 |
| 41 | sodium carbonate | 100 | molybdenum naphthenate | 20 | 10 | 25 |
| Comparative Example 3 | none | | chromium naphthenate | 20 | 10 | 100 |

EXAMPLE 42

Metaxylene was oxidized in acetic acid solvent and in the presence of a cobalt compound, a manganese compound and a bromine compound following the routine of Example 1 to obtain isophthalic acid. The isophthalic acid obtained was esterified with methanol in the absence of catalyst following the routine of Example 1, and methanol and water were separated by distillation from the resultant product mixture as in Example 1 to obtain dimethyl isophthalate. The thus obtained ester contained 0.5 percent (by weight) methyl metaformylbenzoate. The molten color of the obtained dimethyl isophthalate at 150°c was 700 APHA.

To 300g of the above dimethyl isophthalate was added sodium acetate in an amount of $5 \times 10^{-8}$ gram-atoms in terms of sodium metal, and air was introduced into the resultant mixture at 180°C at a rate of 20l/hour whereby the mixture was contacted with air for 30 minutes at 180°C, whereafter the resultant reaction mixture was distilled. The content of methyl metaformylbenzoate in the dimethyl isophthalate obtained after the distillation was 50 ppm (by weight), and the initial molten color thereof was 15 APHA and the color statility thereof was 40 APHA.

While the invention has been described in detail and with reference to specific embodiments thereof, it will be apparent to one skilled in the art that various changes and modifications can be made therein departing from the spirit and scope thereof.

we claim:

1. A process for the oxidative purification of dimethyl phthalates wherein the formation of impurities which reduce color stability is avoided characterized in that:

a dimethyl phthalate prepared from a phthalic acid which has been obtained by the oxidation of a xylene is treated with a gas containing molecular oxygen in the presence of a compound selected from the group consisting of an alkali metal compound, an alkaline earth metal compound and a mixture thereof in combination with a heavy metal compound, said purification being under liquid phase conditions, and then the dimethyl phthalate is separated from the resultant oxidized product; wherein the amount of the compound selected from the group consisting of the alkali metal compound, alkaline earth metal compound and mixture thereof added is in the range of about $10^{-10}$ gram-atoms to about $5 \times 10^{-5}$ gram-atoms, in terms of metal atoms, per 1 g of dimethyl phthalate;

the alkali metal and/or alkaline earth metal compounds are at least one member selected from the group consisting of organic acid salts having 1 to 20 carbon atoms, carbonates, bicarbonates, phosphates, borates, hydroxides, alcoholates having 1 to 5 carbon atoms and phenolates having 6 to 8 carbon atoms of alkali metals and alkaline earth metals; and the heavy metal compound is selected from the group consisting of a compound of chromium, manganese, nickel and copper.

2. A process as claimed in claim 1 wherein the alkali metal compound is a compound of a metal selected from the group consisting of lithium, sodium and potassium.

3. A process as claimed in claim 1 wherein the amount of the heavy metal compound is in the range of about $10^{-9}$ gram-atoms to about $10^{-3}$ gram-atoms as heavy metal per gram of dimethyl phthalate.

4. A process as claimed in claim 1 wherein the treatment of the dimethyl phthalate with the gas containing molecular oxygen is carried out while the dimethyl phthalate is molten and at a temperature in the range of about 140°C to about 300°C.

5. A process as claimed in claim 1 wherein dimethyl phthalate is dimethyl terephthalate.

6. A process as claimed in claim 1 wherein the dimethyl phthalate is separated by the distillation under a reduced pressure from the resultant oxidized product.

7. A process as claimed in claim 1 wherein said purification is conducted in the presence of an alkali metal compound.

8. A process as claimed in claim 1 wherein said purification is conducted in the presence of an alkaline earth metal compound.

9. A process as claimed in claim 1 wherein said purification is conducted in the presence of a mixture of an alkali metal compound and an alkaline earth metal compound.

10. A process as claimed in claim 1 wherein said alkali metal compound or alkaline earth metal compound is an organic acid salt having 1 to 20 carbon atoms.

11. A process as claimed in claim 1 wherein said alkali metal or alkaline earth metal compound is selected from the group consisting of a carbonate and bicarbonate.

12. A process as claimed in claim 1 wherein said alkali metal or alkaline earth metal compound is a borate.

13. A process as claimed in claim 1 wherein said alkali metal or alkaline earth metal compound is a hydroxide.

14. A process as claimed in claim 1 wherein said akali metal or alkaline earth metal compound is a phosphate.

15. A process as claimed in claim 1 wherein said alkali metal or alkaline earth metal compound is an alcoholate having 1 to 5 carbon atoms.

16. A process as claimed in claim 1 wherein said alkali metal or alkaline earth metal compound is a phenolate having 6 to 8 carbon atoms.

17. A process as claimed in claim 1 wherein the major impurity separated is methyl formyl benzoate, and the alkali metal and/or alkaline earth metal compound serve to prevent the formation of impurities from methyl formyl benzoate during the oxidative purification, which oxidative purification is conducted under the following conditions:

the amount of the compound selected from the group consisting of the alkali metal compound alkaline earth metal compound and mixture thereof added is in the range of about $10^{-10}$ gram-atoms to about $5 \times 10^{-5}$ gram-atoms, in terms of metal atoms, per 1 g of dimethyl phthalate the treatment of the dimethyl phthalate with the gas containing molecular oxygen is carried out while the dimethyl phthalate is molten and at a temperature in the range of about 140°C to about 300°C.

the pressure is atmospheric to about 30 kg/cm$^2$ gauge; the amount of oxygen is more than the stoichimetric amount necessary for the oxidation of impurities and is about $3l$ to about $1 Kl$ per 1 kg of dimethyl terephthalate (calculated at normal temperature and pressure);

the time of oxidative purification is about 10 to about 240 minutes and wherein the dimethyl phthalate is separated by the distillation under a reduced pressure from the resultant oxidized product.

18. A process as claimed in claim 17 where the alkali metal and/or alkaline earth metal compound are at least one member selected from the group consisting of organic acid salts having 1 to 20 carbon atoms, carbonates, bicarbonates, phosphates, borates, hydroxides, alcoholates having 1 to 5 carbon atoms and phenolates having 6 to 8 carbon atoms of alkali metals and alkaline earth metals, the amount of alkali metal compound and/or alkaline earth metal compound is $10^{-10}$ gram-atoms to $10^{-6}$ gram atoms (same basis) and temperature is 150° to 280°C and the time is 20 minutes to 120 minutes.

* * * * *